United States Patent

[11] 3,583,685

| [72] | Inventors | Frank E. Boerger;<br>William H. White, Jr., both of,<br>Poughkeepsie, N.Y. |
|---|---|---|
| [21] | Appl. No. | 762,795 |
| [22] | Filed | Sept. 26, 1968 |
| [45] | Patented | June 8, 1971 |
| [73] | Assignee | International Business Machines<br>Corporation<br>Armonk, N.Y. |

[54] METHOD AND APPARATUS FOR CONTROLLING QUANTITY OF A VAPOR IN A GAS
19 Claims, 2 Drawing Figs.

[52] U.S. Cl. ........................................... 261/128,
261/16, 261/121, 261/138, 23/294, 202/201,
202/206, 202/235, 203/49, 203/100
[51] Int. Cl. ........................................... B01f 3/04
[50] Field of Search ........................................... 202/206,
233, 235, 234, 201; 203/10, 11, 49, 100; 55/40,
38, 37, 36; 23/294; 62/50; 261/121, 16, 138

[56] References Cited
UNITED STATES PATENTS

| 1,694,179 | 12/1928 | Jenks .............................. | 202/233 |
| 2,095,578 | 10/1937 | Theiler .......................... | 203/49X |
| 2,727,855 | 12/1955 | Goldsbarry .................... | 202/235X |
| 2,732,415 | 1/1956 | Klinge ............................ | 202/233X |
| 2,211,448 | 8/1940 | Vaughn et al ................. | 261/121X |
| 585,365 | 6/1897 | Skiffington .................... | 202/185.2 |

*Primary Examiner*—Norman Yudkoff
*Assistant Examiner*—David Edwards
*Attorneys*—Hanifin and Clark and Frank C. Leach, Jr.

ABSTRACT: The quantity of a liquid vapor in a gas is controlled by mixing a first stream of gas saturated with the liquid vapor and a second stream of dry gas. The flow rate of each of the streams of gas and/or the temperature of the liquid vaporized into the gas determine the percent of the liquid vapor in the mixed stream of gas.

PATENTED JUN 8 1971 3,583,685

METHOD AND APPARATUS FOR CONTROLLING QUANTITY OF A VAPOR IN A GAS

In growing a thermal oxide on a silicon slice on which an integrated circuit may be formed, for example, the rate of oxide formation may be increased by using water saturated oxygen. However, in order to regulate the rate of oxide formation, it is necessary to control the quantity of the water being directed through the reactor in which the silicon slice is disposed for formation of the oxide thereon.

Thus, to utilize water saturated oxygen to form an oxide on a silicon slice, for example, it is necessary to control the quantity of water vapor in the oxygen supplied to the reactor. By appropriately controlling the temperature of the reactor and knowing the amount of water vapor in the oxygen and the flow rate of the oxygen, the rate of oxide formation may be accurately controlled.

The present invention solves the problem of controlling the amount of water saturated oxygen that is supplied to the reactor. Accordingly, when the present invention is utilized to supply water saturated oxygen to the reactor, precise control of the rate of formation of the oxide on the silicon slice is obtained.

The present invention relies upon the temperature of the liquid, which is being vaporized for entrainment in a stream of dry gas, to determine the quantity of liquid entrained in a predetermined volume of the gas. Thus, as the temperature of the liquid is increased, a higher degree of saturation for a given volume of the gas is obtained since an increase in the temperature of the evaporating liquid produces a greater rate of evaporation of the liquid to increase the amount of liquid saturated in a given volume of the gas.

By varying the flow rate of the gas through the liquid, the total amount of liquid supplied in a given period of time may be varied. Thus, if the flow rate of the gas through the liquid is increased, a greater quantity of liquid will be supplied in a given period of time for a given temperature of the evaporating liquid. Of course, if the temperature of the liquid is increased, then the liquid supplied in a predetermined period of time also would be increased since a greater amount of liquid is entrained in a given volume of the gas. Likewise, a decrease in the temperature of the liquid would result in a drop in the liquid supplied in a given period of time.

Accordingly, the flow rate of the gas into the evaporating liquid may be utilized in conjunction with the temperature of the liquid to obtain a selected quantity of liquid flowing from the apparatus in a predetermined period of time.

In order to obtain a wide range of the percent of liquid vapor in the gas supplied to the reactor, a second stream of dry gas may be introduced exterior of the area in which the first stream of dry gas is saturated with the liquid vapor. This permits a wide range of the percent of liquid in the gas supplied from the apparatus of the present invention.

An object of this invention is to provide a method and apparatus for controlling the quantity of liquid vapor in a gas.

Another object of this invention is to provide a method and apparatus for precisely controlling the quantity of liquid vapor in a gas.

The foregoing and other objects, features, and advantages of the invention will be more apparent from the following more particular description of the preferred embodiment of the invention as illustrated in the accompanying drawing.

Figures 1, 2:
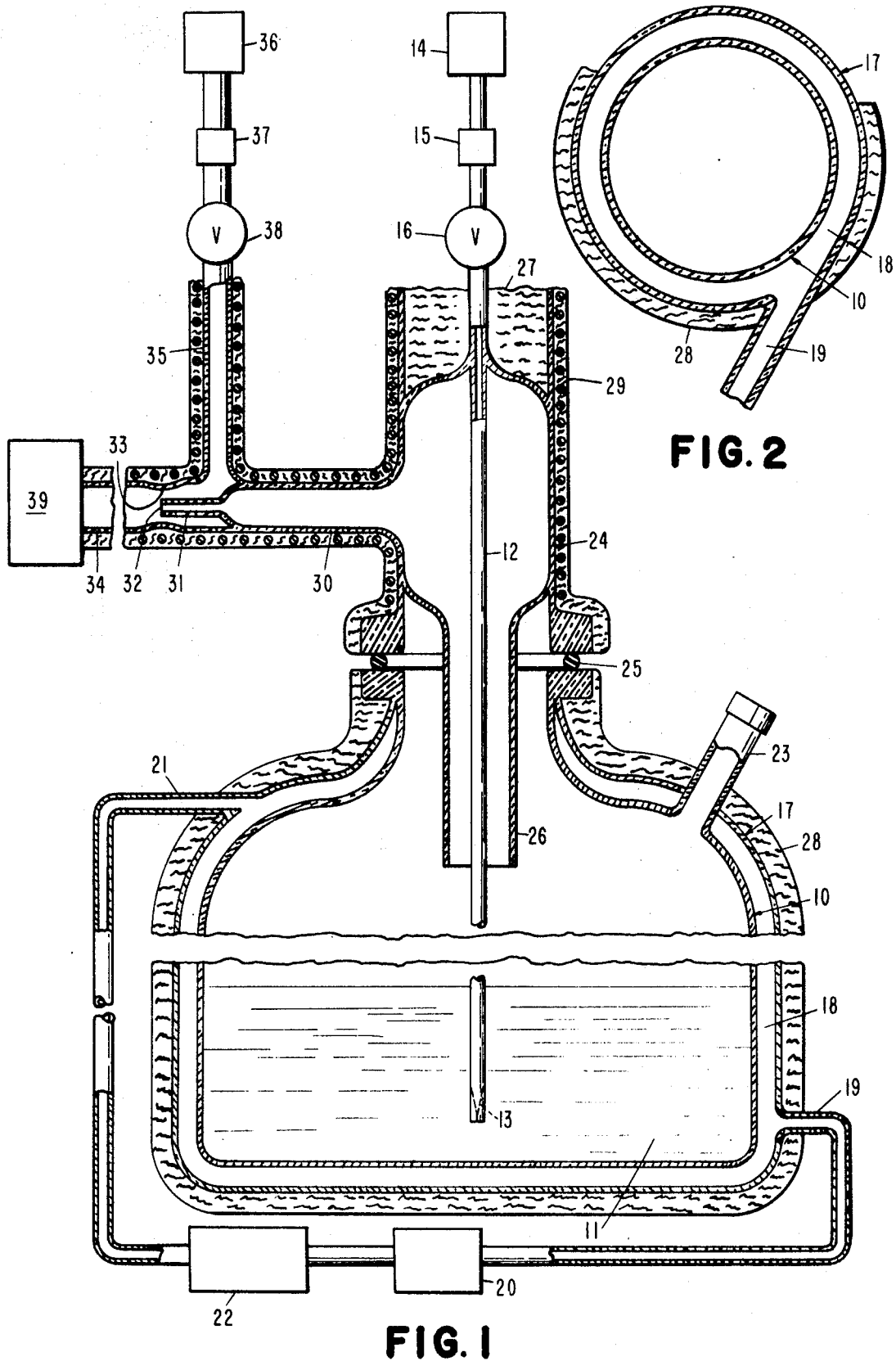
FIG. 1 is a schematic sectional view showing the apparatus of the present invention for producing a regulated quantity of a liquid vapor in a gas.
FIG. 2 is a schematic sectional view illustrating the introduction of liquid into a jacket for controlling the temperature of the liquid to be vaporized by the apparatus of the present invention.

Referring to the drawing and particularly FIG. 1, there is shown a reservoir 10 having a liquid 11 therein. The liquid 11 is vaporized for saturating dry gas, which is introduced into the reservoir 10 through a tube 12.

The lower end of the tube 12 is formed with a capillary 13 or the like to cause the gas to exit from the tube 12 in bubbles of as small a diameter as possible. This produces maximum saturation of the gas by the liquid 11. Instead of utilizing the capillary 13, any other suitable means such as fritted glass, for example, might be utilized to obtain bubbles of as small a diameter as possible.

The dry gas is supplied to the tube 12 from a source 14 of dry gas. A pressure regulator 15 is disposed between the source 14 and the reservoir 10 to reduce the pressure of the gas to a desired value. Since the pressure of the gas would affect the partial pressure of saturation (This is determined by the temperature of the liquid 11.), it is desirable to control the pressure of the dry gas passing through the tube 12 to minimize any effect on the partial pressure of saturation. The flow rate of the gas to the tube 12 is regulated by a valve 16, which is positioned between the regulator 15 and the reservoir 10.

The reservoir 10 is surrounded and enclosed by a jacket 17, which is spaced from the reservoir 10 to form a space 18 therebetween. A liquid is introduced into the space 18 through an inlet pipe 19, which is disposed at a tangent to the jacket 17 as shown in FIG. 2. A pump 20 supplies the liquid to the space 18.

The liquid exits from the space 18 through an outlet pipe 21, which is at a tangent to the jacket 17 in the same manner as the inlet pipe 19. The outlet pipe 21 is connected to the pump 20 through a heat exchanger 22.

Accordingly, a closed system for circulating a liquid through the space 18 is provided. Thus, the liquid in the space 18 is in heat exchange relation with the liquid 11 within the reservoir 10. By regulating the heat exchanger 22 to either heat or cool the liquid flowing therethrough, the temperature of the liquid flowing through the space 18 is controlled to obtain the desired temperature of the liquid 11 within the reservoir 10; this results in the desired quantity of liquid being entrained within the dry gas being supplied to the reservoir 10 through the tube 12.

The temperature of the liquid 11 within the reservoir 10 may be readily ascertained by any suitable means such as a thermocouple (not shown) being inserted through a filler tube 23 of the reservoir 10. The filler tube 23 also permits the liquid 11 to be supplied to the reservoir 10 whenever necessary. It should be understood that a continuous supply of liquid to the reservoir 10 could be utilized if desired.

The upper end of the jacket 17 is sealed to the upper end of the reservoir 10. The junction of the upper end of the reservoir 10 with the lower end of a tube 24 is sealed by an O-ring joint 25. A C-clamp (not shown) retains the upper end of the reservoir 10 and the lower end of the tube 24 together with the joint 25 therebetween.

The tube 24 has a riser tube 26 supported therein with its lower end extending into the reservoir 10 and disposed above the level of the liquid 11 within the reservoir 10. The upper end of the riser tube 26 is enlarged to block the tube 24. An insulation packing 27, which is formed of a suitable material such as fiber glass, for example, is disposed above the upper end of the riser tube 26 to block the tube 24. This serves to prevent any condensation of the liquid, which is within the gas being transported through the riser tube 26.

The riser tube 26 is reduced in size from just above the O-ring joint 25 to its lower end so that this portion of the riser tube 26 is maintained at the temperature at which saturation is occurring within the reservoir 10. Accordingly, this portion of the riser tube 26 is maintained at a temperature at which no condensation of the liquid vapor within the gas, which is passing upwardly through the riser tube 26, can occur.

The jacket 17 is surrounded by insulation packing 28, which is formed of a suitable material such as fiber glass, for example. The insulation also surrounds the O-ring joint 25. Thus, ambient conditions cannot effect either the temperature within the reservoir 10 or the temperature of the liquid in the space 18.

The tube 24 is surrounded by a heating coil 29. The heating coil 29 is surrounded by insulating material such as fiber glass, for example. The heating coil 29 maintains the tube 24 at a temperature at which no condensation of the liquid vapor within the gas passing through the riser tube 26 can occur.

The riser tube 26 has a reduced portion 30 extending substantially perpendicular to the axis of the tube 24. The reduced portion 30 terminates in a nozzle 31, which has its end 32 located in the plane of a restricted orifice 33 of an outlet tube 34, which is carried by the reduced portion 30 of the riser tube 26 and fused thereto. Accordingly, by utilizing the nozzle 31, the pressure at the outlet of the riser tube 26 is increased beyond that within the reservoir 10.

A supply tube 35, which is connected to a source 36 of dry gas, communicates with the outlet tube 34 between the orifice 33 and the portion 30 of the riser tube 26 to supply dry gas to the outlet tube 34. A pressure regulator 37 is connected to the source 36 of the dry gas to regulate the pressure at which the gas is supplied to the outlet tube 35. A valve 38 is disposed between the regulator 37 and the connection of the tube 35 to the outlet tube 34 to regulate the quantity of the gas that is supplied to the outlet tube 34 from the source 36.

When the gas from the tube 35 flows into the outlet tube 34 and past the orifice 33, a back pressure is created at the outlet end 32 of the nozzle 31. This back pressure insures that there can be no positive flow of the gas from the nozzle 31 into the outlet tube 34 unless there is flow through the tube 12. This is necessary to prevent any possible change in the controlled conditions within the reservoir 10 in which the dry gas flowing through the tube 12 is being saturated by the evaporating liquid 11.

The outlet tube 34 connects with a reactor 39, for example, in which the mixture of the liquid and gas is to be utilized. If the gas is oxygen and the liquid is water, the mixture may be utilized to form a thermal oxide on a silicon slice within the reactor 39.

It is necessary for the heating coil 29, which is surrounded by the insulation material, to also surround both the supply tube 35 and the outlet tube 34. This insures that the gas, which is being introduced through the tube 35, is sufficiently heated to be at a temperature higher than the condensation temperature of the liquid vapor within the gas being supplied through the nozzle 31 from the reservoir 10. Likewise, by surrounding the outlet tube 34 with the heating coil 29 and the insulating material, no condensation of the liquid vapor within the gas can occur until it is supplied to the reactor 39.

Considering the operation of the present invention, dry gas is supplied to the reservoir 10 through the tube 12. The flow rate of the dry gas through the tube 12 into the reservoir 10 is regulated by the valve 16.

The temperature at which the liquid 11 is maintained depends on the desired quantity of the liquid 11 to be entrained in the gas escaping through the riser tube 26. Accordingly, the temperature of the liquid 11 is regulated by controlling the temperature of the liquid flowing through the jacket 18.

The total volume of the gas supplied from the outlet tube 34 is determined by the total of the flow of the gas through the tube 12 and the flow of the gas through the supply tube 35. Accordingly, since the flow rate of the gas through the tube 12 must not be too high to obtain saturation of the gas as it passes through the liquid 11, it is necessary to utilize a high volume flow rate through the supply tube 35 whenever a relatively high volume of gas is to be supplied through the outlet tube 34. The quantity of the dry gas supplied through the supply tube 35 is regulated by the valve 38.

When the gas entering through the tube 35 passes through the orifice 33, it creates a back pressure at the end 32 of the nozzle 31. Thus, none of the gas flowing in the riser tube 26 can flow out of the end 32 of the nozzle 31 unless there is flow through the tube 12.

If it is desired to increase the percent or quantity of the liquid vapor in the gas supplied through the outlet tube 34 for a given volume of the gas, the flow rate of the gas through the tube 12 may be increased, the temperature of the liquid 11 may be increased, or the flow rate through the tube 35 may be decreased. If there is an increase in the flow rate through the tube 12 or a decrease in the flow rate through the tube 35 and a specific flow rate through the outlet tube 34 is desired, it is necessary to appropriately change the flow rate in the other of the tubes. Thus, if the flow rate in the tube 12 is increased, it is necessary to reduce the flow rate in the tube 35 so that the total volume passing through the tube 34 in a given time is still the same.

Accordingly, if the present invention is being utilized to supply oxygen having water vapor therein to the reactor 39 to form an oxide on silicon slices within the reactor 39, the growth rate of the oxygen within the reactor 39 for a specific temperature within the reactor 39 is determined by the temperature of the liquid 11 in the reservoir 10, the flow rate through the tube 12, and the flow rate through the tube 35. Thus, the growth rate of the oxide may be varied by varying the flow rate through the tube 12, the temperature of the liquid 11 in the reservoir 10, or the flow rate of the gas through the tube 35. Accordingly, a specific and selected growth rate of the thermal oxide on the silicon slices within the reactor 39 is obtained by employing the present invention.

Whenever it is desired to shut down the apparatus of the present invention, the flow of the gas through the tube 12 is stopped by closing the valve 16. Because of the back pressure created by the gas flowing from the tube 35 through the orifice 33, the back pressure at the end 32 of the nozzle 31 aids in shutting down the apparatus of the present invention since this pressure forces the vapor back into the reservoir 10.

While the present invention has been described with oxygen as the gas and water as the liquid, it should be understood that any other suitable gas and liquid, which may be mixed by vaporizing the liquid through saturating the gas, may be employed. While the pressure at which the gas enters the reservoir 10 through the tube 12 is not critical when using water as the liquid although it does affect the partial pressure of saturation created by the temperature of the liquid 11, the pressure of the dry gas is critical when other liquids than water are employed with certain gases. When this criticality feature exists, it is necessary to precisely control the pressure of the gas in the tube 12 by the regulator 15.

While the tube 35 has been shown as being employed with the riser tube 26 to mix two streams of the gas to obtain a relatively small total percent of liquid vapor within the gas, no gas, which is the same type as that supplied through the tube 12, would be supplied to the outlet tube 35 if the desired percent of the liquid within the gas could be obtained merely by saturating the gas flowing through the tube 12 into the reservoir 10. However, in this arrangement, it would normally be necessary to supply an inert gas through the tube 35 to obtain the desired flow rate through the reactor 39. Of course, if the pressure within the reservoir 10 should be sufficiently high due to a relatively high temperature of the liquid 11 creating a high partial pressure within the reservoir 10, then a carrier gas would not have to be introduced through the tube 35.

While the gas has been shown as being heated when flowing through the supply tube 35 into the outlet tube 34, it should be understood that the gas need not be heated if the temperature of condensation of the liquid vapor within the gas flowing through the nozzle 31 is below the temperature of the gas entering through the tube 35. The gas passing through the tube 35 is heated to avoid any condensation of the liquid vapor during mixing of the two gases at the outlet end 32 of the nozzle 31.

An advantage of this invention is that the ratio of a liquid vapor in a gas may be accurately controlled. Another advantage of this invention is that the quantity of the liquid vapor within a gas may be varied as desired.

While the invention has been particularly shown and described with reference to a preferred embodiment thereof, it will be understood by those skilled in the art that various changes in form and details may be made therein without departing from the spirit and scope of the invention.

What I claim is:

1. An apparatus for controlling the quantity of vapor in a gas including:
   means to vaporize a liquid;
   means to supply a stream of dry gas to said vaporizing means to saturate the stream of gas with the vapor;
   said vaporizing means includes:
   a reservoir of liquid;
   jacket means surrounding said reservoir in spaced relation thereto;
   means to pass a liquid through the space between said jacket means and said reservoir in heat transfer relation with the liquid in said reservoir; and
   means to control the temperature of the liquid passing through the space between said jacket means and said reservoir to produce the desired vaporization of the liquid within said reservoir by regulating the temperature of the liquid within said reservoir;
   means to convey the saturated stream of gas from said reservoir; and
   means attached to said conveying means to prevent condensation of the vapor in the saturated stream of gas within said conveying means.

2. An apparatus for controlling the quantity of a vapor in a gas including:
   means to vaporize a liquid;
   first means to supply a first stream of dry gas to said vaporizing means to saturate the first stream of gas with the vapor;
   second means to direct the saturated gas from said vaporizing means;
   third means to supply a second stream of dry gas;
   means communicating with said second means and said third means for mixing the gas in said third means with the saturated gas in said second means to form a single stream of gas partially saturated with the vapor; and
   means to prevent condensation of the vapor in the saturated gas during its flow from said vaporizing means through said second means and through said mixing means.

3. The apparatus according to claim 2 including means to vary the supply of at least one of the two streams of dry gas to vary the percent of vapor in the mixed stream of gas.

4. The apparatus according to claim 3 in which said varying means includes means to vary the supply of both of the streams of dry gas.

5. The apparatus according to claim 2 in which said vaporizing means includes means to vary the temperature of the liquid being vaporized.

6. The apparatus according to claim 4 in which said vaporizing means includes means to vary the temperature of the liquid being vaporized.

7. The apparatus according to claim 6 in which said mixing means includes means to produce a back pressure in said second means.

8. An apparatus for controlling the quantity of a vapor in a gas including:
   means to vaporize a liquid;
   first means to supply a first stream of dry gas to said vaporizing means to saturate the first stream of dry gas with the vapor;
   second means to direct the saturated gas from said vaporizing means;
   third means to supply a second stream of the dry gas separate from the first stream of dry gas;
   said third means including a passage into which said second means extends;
   said second means terminating in a nozzle disposed within said passage;
   said passage having a minimum restricted orifice;
   means to stop the supply of the first stream of dry gas to said vaporizing means; and
   said nozzle of said second means having its outlet end disposed at said orifice to produce mixing in said passage of the saturated gas in said second means with the dry gas from said third means to form a single stream of gas partially saturated with the vapor and to create a back pressure in said second means to prevent flow from said vaporizing means through said second means when said stopping means stops flow of the first stream of dry gas to said vaporizing means while flow of the second stream of dry gas continues.

9. The apparatus according to claim 2 in which:
   said first means has its lower end extending beneath the level of the liquid in said reservoir; and
   said lower end of said first means has a relatively small outlet orifice.

10. The apparatus according to claim 2 in which:
    said vaporizing means includes:
    a reservoir of liquid;
    jacket means surrounding said reservoir in spaced relation thereto;
    means to pass a liquid through the space between said jacket means and said reservoir in heat transfer relation with the liquid in said reservoir; and
    means to control the temperature of the liquid passing through the space between said jacket means and said reservoir to produce the desired vaporization of the liquid within said reservoir by regulating the temperature of the liquid within said reservoir.

11. A method of supplying a gas having a controlled quantity of a vapor therein including:
    passing a stream of dry gas into contact with a vaporizing liquid with which the dry gas has had no previous contact;
    varying the temperature of the vaporizing liquid to vary the percent of the vapor in the gas by varying the temperature of a liquid in heat exchange relation therewith;
    conveying the gas with the vapor therein from the vaporizing liquid; and
    preventing condensation of the vapor in the conveying gas.

12. A method of supplying a gas having a controlled quantity of a vapor therein including:
    passing a first stream of a dry gas into contact with a vaporizing liquid;
    controlling the conditions of vaporizing the liquid to control the amount of vapor entrained in the gas;
    passing a second stream of the dry gas into contact with the moisture laden first stream of gas to form the supply of gas;
    controlling the flow rate of at least one of the first and second streams to control the percent of vapor in the supply gas; and
    preventing condensation of the vapor before and after the second stream of the dry gas is passed in contact with the moisture laden first stream of gas.

13. The apparatus according to claim 2 in which said preventing means includes means to control the temperature of the second stream of the dry gas to prevent condensation of the vapor when the second stream of the dry gas is mixed in said mixing means with the saturated gas in said second means.

14. The apparatus according to claim 2 including:
    means to convey the single stream of gas partially saturated with the vapor from said mixing means; and
    said preventing means including means to prevent condensation of the vapor in the single stream of gas in said conveying means.

15. The method according to claim 12 including controlling the temperature of the second stream of dry gas to prevent condensation of vapor in the first stream of gas when the second stream of dry gas contacts the first stream of gas.

16. An apparatus for controlling the quantity of a vapor in a gas including:
    means to vaporize a liquid;
    first means to supply a first stream of dry gas to said vaporizing means to saturate the first stream of gas with the vapor;
    second means to direct the saturated gas from said vaporizing means;

third means to supply a second stream of the dry gas separate from the first stream of dry gas;

means for mixing the gas in said third means with the saturated gas in said second means to form a single stream of gas partially saturated with the vapor;

means to stop the supply of the first stream of dry gas to said vaporizing means; and said mixing means including means to produce a back pressure in said second means to prevent flow from said vaporizing means through said second means when said stopping means stops flow of the first stream of dry gas to said vaporizing means while flow of the second stream of dry gas continues.

17. The apparatus according to claim 8 in which:

said vaporizing means includes a reservoir of liquid; and said second means includes a riser having its lower end disposed above the level of the liquid in said reservoir, said riser communicating with said nozzle.

18. An apparatus for controlling the quantity of a vapor in a gas including:

means to vaporize a liquid;

first means to supply a first stream of dry gas to said vaporizing means to saturate the first stream of gas with the vapor;

second means to direct the saturated gas from said vaporizing means;

third means to supply a second stream of the dry gas separate from the first stream of dry gas;

said third means including a passage into which said second means extends;

said second means terminating in a nozzle disposed within said passage;

said passage decreasing in cross-sectional area as said passage extends downstream to a minimum cross-sectional area and then increasing in cross-sectional area from the minimum cross-sectional area;

means to stop the supply of the first stream of dry gas to said vaporizing means; and said nozzle of said second means having a substantially smaller cross-sectional area than the minimum cross-sectional area of said passage and having its outlet end disposed at the minimum cross-sectional area of said passage for mixing in said passage the saturated gas in said second means with the dry gas from said third means to form a single stream of gas partially saturated with the vapor and to create a back pressure in said second means to prevent flow from said vaporizing means through said second means when said stopping means stops flow of the first stream of dry gas to said vaporizing means while flow of the second stream of dry gas continues.

19. The apparatus according to claim 18 in which said passage has a uniform decrease in its cross-sectional area to its minimum cross-sectional area and a uniform increase in its cross-sectional area from its minimum cross-sectional area.